US010138346B2

(12) United States Patent
Duong et al.

(10) Patent No.: US 10,138,346 B2
(45) Date of Patent: Nov. 27, 2018

(54) POLYSACCHARIDE AEROGEL

(71) Applicant: National University of Singapore, Singapore (SG)

(72) Inventors: Hai Minh Duong, Singapore (SG); Beng Chye Vincent Tan, Singapore (SG); Truong Son Nguyen, Singapore (SG); Shao Kai Ng, Singapore (SG)

(73) Assignee: National University of Singapore, Singapore (SG)

( * ) Notice: Subject to any disclaimer, the term of this patent is extended or adjusted under 35 U.S.C. 154(b) by 37 days.

(21) Appl. No.: 14/888,334

(22) PCT Filed: May 2, 2014

(86) PCT No.: PCT/SG2014/000195
§ 371 (c)(1),
(2) Date: Oct. 30, 2015

(87) PCT Pub. No.: WO2014/178797
PCT Pub. Date: Nov. 6, 2014

(65) Prior Publication Data
US 2016/0068650 A1    Mar. 10, 2016

Related U.S. Application Data

(60) Provisional application No. 61/818,970, filed on May 3, 2013.

(51) Int. Cl.
*C08J 9/28* (2006.01)
*B01J 20/24* (2006.01)
(Continued)

(52) U.S. Cl.
CPC ............. *C08J 9/28* (2013.01); *B01J 20/24* (2013.01); *B01J 20/28047* (2013.01); *B01J 20/28085* (2013.01); *B01J 20/3085* (2013.01); *B01J 20/3214* (2013.01); *C08J 3/075* (2013.01); *C08J 3/16* (2013.01); *C08J 9/365* (2013.01); *E04B 1/88* (2013.01); *C08J 2201/036* (2013.01); *C08J 2201/0484* (2013.01); *C08J 2205/026* (2013.01); *C08J 2205/044* (2013.01); *C08J 2205/05* (2013.01); *C08J 2301/02* (2013.01); *E04B 2001/746* (2013.01)

(58) Field of Classification Search
CPC .............. C08J 3/075; C08J 2205/026; C08J 2205/044; C08J 2301/02; E04B 1/88; E04B 2001/746
See application file for complete search history.

(56) References Cited

U.S. PATENT DOCUMENTS

| | | | |
|---|---|---|---|
| 2011/0180751 A1* | 7/2011 | Rein | C08B 1/003 252/182.12 |
| 2013/0171439 A1* | 7/2013 | Shoseyov | B82Y 30/00 428/220 |
| 2014/0079931 A1* | 3/2014 | Berglund | B82Y 30/00 428/219 |

OTHER PUBLICATIONS

Gavillon et al., "Aerocellulose: New Highly Porous Cellulose Prepared from Cellulose-NaOH Aqueous Solutions" Biomacromolecules 2008 9 269-277.*
(Continued)

*Primary Examiner* — Hai Vo
(74) *Attorney, Agent, or Firm* — Cesari & McKenna, LLP

(57) ABSTRACT

A polysaccharide based aerogel comprising a network of polysaccharide fibers with pores therebetween, wherein the sizes of the pores are in the micrometer range.

20 Claims, 11 Drawing Sheets

(51) Int. Cl.
*B01J 20/32* (2006.01)
*B01J 20/30* (2006.01)
*E04B 1/88* (2006.01)
*C08J 9/36* (2006.01)
*C08J 3/075* (2006.01)
*C08J 3/16* (2006.01)
*B01J 20/28* (2006.01)
*E04B 1/74* (2006.01)

(56) References Cited

OTHER PUBLICATIONS

Fischer et al "Cellulose-Based Aerogels" Polymer vol. 47, pp. 7636-7645. 2006.
Heath et al "Cellulose Nanowhisker Aerogels" Green Chemistry vol. 12, pp. 1448-1453. 2010.
Grishechko et al "New Tannin-Lignin Aerogels" Industrial Crops and Products vol. 41, pp. 347-355. 2013.
Nguyen et al "Advanced Thermal Insulation and Absorption Properties of Recycled Cellulose Aerogels" Colloids and Surfaces A: Physicochemical and Engineering Aspects vol. 445, pp. 128-134. 2014.
Aerogel "Functionalization" http://www.aeroael.org/?p=1918. Retrieved Nov. 12, 2015.

\* cited by examiner

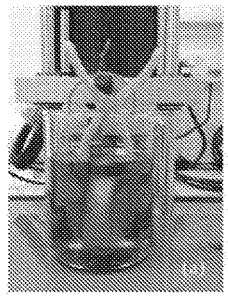 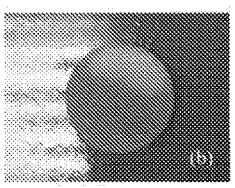 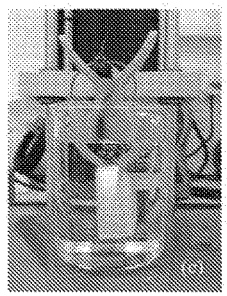 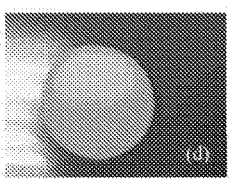
Fig. 6(a)  Fig. 6(b)  Fig. 6(c)  Fig. 6(d)
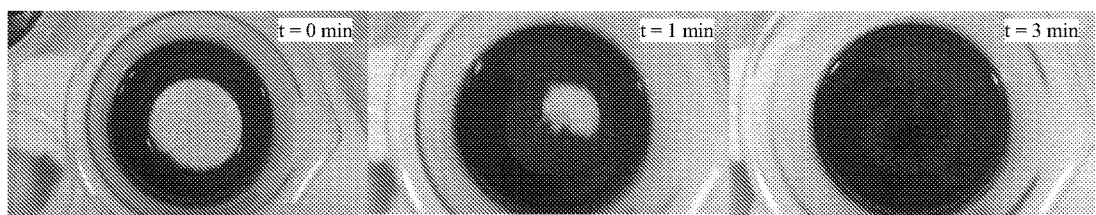
Fig. 7(a)  Fig. 7(b)  Fig. 7(c)

POLYSACCHARIDE AEROGEL

CROSS REFERENCE TO RELATED APPLICATIONS

This application is the National Stage of International Application No. PCT/SG2014/000195, filed on May 2, 2014, which claims the benefit of U.S. Provisional Application No. 61/818,970, filed on May 3, 2013. The contents of both applications are hereby incorporated by reference in their entirety.

TECHNICAL FIELD

The present invention generally relates to a polysaccharide based aerogel. The present invention also relates to method of forming the polysaccharide based aerogel and uses thereof.

BACKGROUND

Aerogels are dried gels that are extremely light, with properties such as high porosities and large surface areas. Materials that are typically used for aerogels include silica, carbon, alumina or chalcogens. However, silica aerogels are extremely brittle and processes to form the above aerogels are costly, with some processes requiring solvents that are toxic to the environment.

Due to the low thermal conductivity of the aerogels, they have been investigated for use as thermal insulators. Greenhouse effect has been warming up the earth and threatening human life. It was found that $CO_2$ emission from buildings contributed more than 30% of greenhouse gas emission in developed countries in 2005. Buildings also accounted for 39% of energy consumption in this year. Improving thermal insulation of buildings is one of the most effective solutions for the issue. Therefore, there have been many efforts in developing new insulation materials. Silica aerogels have been proposed as insulation materials for buildings. However, they are very brittle. A flexible aerogel-based insulation material (based on a composite containing methylsilylated Silica and polyethylene terephthalate) has been developed but it is much more expensive than conventional insulation materials.

High energy consumption, climate changes and the depletion of fossil fuels require more sustainable and energy efficient construction solutions. In order to meet the demand of improved energy efficiency, the thermal insulation of building plays an important role. To achieve better thermal insulation with current insulation materials, thicker walls are expected. However, this will increase the building cost and affect several issues like floor area, architectural restrictions, etc. As a result, it is essential to develop cheaper insulation materials with low thermal conductivity for construction applications. In tropical climates, high humidity is an additional factor affecting the lifetime of buildings. As the moisture content in the surrounding air is high, this may facilitate the growth of harmful microorganisms such as mould or bacteria that can cause allergy or respiratory problems. In addition, the high humidity of the air may cause condensation to form on surfaces that are exposed to the outside air such as windows, walls or ceilings, which can be colder than the outside air (due to the use of air-conditioners indoors). The condensed moisture potentially damages building materials.

While aerogels have limited applications in environmental cleanups such as cleaning chemical spills or removal of heavy metals from water, they have not been extensively investigated for use in other types of environmental contamination.

In order to clean up oil spills, sorbents have been used instead as an alternative to or together with traditional methods such as booms, skimmers, dispersants or burning. However, these traditional methods are not very effective to remove the oil completely from the water and are expensive. Sorbents for oil removal can be classified as inorganic mineral, synthetic organic and natural organic materials. The absorption capacities of common absorbents like polypropylene can be up to 25 times of their weight. However, the high cost and low biodegradability are the main drawbacks of this technique.

Aerogels also find limited use in applications that require the absorption of water. Due to the hygroscopic nature of aerogels such as silica aerogels, when the silica aerogels are placed in liquid water, the aerogel structure actually collapses due to the exertion of strong capillary forces by the absorbed water, leading to fracture of the solid silica backbone. Superabsorbent polymers are used instead to absorb water. Superabsorbent polymers are materials that have the ability to absorb and retain large volumes of water. As a result, they are used in water absorbing applications such as baby diapers and feminine napkins. They can swell in water to form rubbery gels that can be up to 99 wt % water. However, the absorbed water can only be removed by drying and the absorbents are not biodegradable.

There is a need to provide an aerogel that overcomes, or at least ameliorates, one or more of the disadvantages described above.

SUMMARY

According to a first aspect, there is provided a polysaccharide based aerogel comprising a network of polysaccharide fibers with pores therebetween, wherein the sizes of the pores are in the micrometer range.

Advantageously, the large size of the pores (in the micrometer range) may enable the aerogel to absorb huge amounts of a liquid, indicating the high absorbance capacity of the aerogel.

Advantageously, the aerogel may be coated with a suitable hydrophobic agent to confer a hydrophobic wetting property to the aerogel. Due to the hydrophobic property of the aerogel, the aerogel may be used to absorb a non-polar liquid such as oil. The large size of the pores may enable the aerogel to absorb high viscosity non-polar liquids as it may be easier for the non-polar liquid to diffuse into the large pores. The aerogel may be "self-cleaning" such that any dirt on the aerogel may be removed from the aerogel when a water droplet rolls along the surface of the aerogel, collecting and carrying the dirt with it.

Any absorbed liquid can be removed from the aerogel by exerting a pressure on the aerogel. Advantageously, this is a simple method to remove the absorbed liquid and may not require more complicated methods such as drying the aerogel. Once the absorbed liquid is released from the aerogel, the aerogel can be used again, facilitating the reusability of the aerogel.

Where the polysaccharide is cellulose, as compared to nanocellulose aerogels made from pure cellulose fibers (either synthesized chemically, derived from bacteria or from plant cellulose obtained directly from a plant raw material), the disclosed cellulose aerogel has pores in the micrometer range, the diameters of the cellulose fibers are in the micrometer range and the lengths of the cellulose fibers are in the millimeters. For a nanocellulose aerogel, the pores are of three orders smaller (in the nanometer range), the diameters and lengths of the nanocellulose fibers are also three orders smaller (in the nanometer range for the diameter and in the micrometer range for the length). Due to the larger pore sizes of the disclosed cellulose aerogel, the disclosed aerogel has a greater absorbance capacity for a given liquid as compared to the nanocellulose aerogel. In addition, the disclosed aerogel is flexible while the nanocellulose aerogel is brittle.

Advantageously, the polysaccharide aerogel has a low thermal conductivity value, which is comparable to those of good insulation materials, indicating the feasibility of using the aerogel has a thermal insulator.

According to a second aspect, there is provided a method for forming a polysaccharide based aerogel comprising the steps of a. dissolving polysaccharide fibers from a recyclable material in a polysaccharide solvent in the presence of sound energy to form a polysaccharide dispersion; and b. forming the polysaccharide dispersion into the aerogel.

Advantageously, the method does not require the use of cross-linkers to link the polysaccharide fibers together as the polysaccharide fibers are able to self-assemble via hydrogen bonding to form a three-dimensional porous network.

According to a third aspect, there is provided a method for forming a hydrophobic polysaccharide based aerogel comprising the steps of a. dissolving polysaccharide fibers from a recyclable material in a polysaccharide solvent in the presence of sound energy to form a polysaccharide dispersion; b. forming the polysaccharide dispersion into the aerogel; and c. coating the aerogel with a hydrophobic agent.

Advantageously, coating the aerogel with the hydrophobic agent may not substantially affect the physical properties of the aerogel. Hence, the flexibility, mechanical and thermal properties of the aerogel may not be adversely affected by the hydrophobic agent coating.

According to a fourth aspect, there is provided a reusable absorbent comprising a polysaccharide based aerogel having a network of polysaccharide fibers with pores therebetween, wherein the sizes of the pores are in the micrometer range.

Advantageously, the absorbent can be reused for at least three times, whereby any absorbed liquid can be simply removed from the aerogel via application of a pressure. After the absorbed liquid is removed, the aerogel may be used again.

According to a fifth aspect, there is provided use of a polysaccharide based aerogel having a network of polysaccharide fibers with pores therebetween, wherein the sizes of the pores are in the micrometer range, for absorbing a non-polar liquid.

Advantageously, the polysaccharide based aerogel may be used to absorb a non-polar liquid from a mixture of polar and non-polar liquids. Where the non-polar liquid is oil, the polysaccharide aerogel may be used in oil remediation.

Definitions

The following words and terms used herein shall have the meaning indicated:

The term 'aerogel' is to be interpreted broadly to refer to a porous material that is formed from a gel, in which the liquid component of the gel is replaced with a gas.

The term 'recycled cellulose' is to be interpreted broadly to refer to cellulose that is obtained from a recyclable material. Types. of recyclable material from which cellulose fibers can be extracted from include waste paper, such as high-grade paper (for example, computer paper, white paper, tab cards, etc) as well as other types of paper (for example, coloured paper, corrugated cardboards, newspapers, magazines, telephone books, catalogs, envelopes, wrapping papers, packing papers, paper bags, etc).

The term 'micrometer range' is to be interpreted broadly to include any dimensions that are in the range of about 1 µm to about 1000 µm.

The term 'nanometer range' is to be interpreted broadly to include any dimensions that are below about 1 µm.

The term 'contact angle' is to be interpreted broadly to include any angle that is measured between a liquid/solid interface. The contact angle is system specific and depends on the interfacial surface tension of the liquid/solid interface. The quantification of liquidphobicity can be expressed as the degree of contact angle of the drop of the liquid on the surface.

The terms 'liquidphobic' and 'liquidphobicity when referring to a surface are to be interpreted broadly to include any property of a surface that does not cause a liquid droplet to substantially spread across it. Generally, if the contact angle between a liquid droplet and the surface is greater than 90°, the surface is liquidphobic or exhibits liquidphobicity. Likewise, the terms 'hydrophobic' and 'hydrophobicity' mean that the surface is liquidphobic or exhibits liquidphobicity when water is the liquid placed thereon. If the contact angle between a water droplet and the surface is greater than 150°, the surface is defined as superhydrophobic.

The terms 'liquidphilic' or 'liquidphilicity' when referring to a surface are to be interpreted broadly to include any property of a surface that causes a liquid droplet to substantially spread across it. Generally, if the contact angle between a liquid droplet and the surface is smaller than 90°, the surface is liquidphilic. Likewise, the terms 'oleophilic' and 'oleophilicity' mean that the surface is liquidphilic or exhibits liquidphilicity when oil is the liquid placed thereon. If the contact angle between an oil droplet and the surface is about 0°, the surface is defined as superoleophilic. The terms 'hydrophilic' and 'hydrophilicity' mean that the surface is liquidphilic or exhibits liquidphilicity when water is the liquid placed thereon. If the contact angle between a water droplet and the surface is about 0°, the surface is defined as superoleophilic.

The term 'self-cleaning' is to be interpreted broadly to refer to the ability of a surface to dispose of any dirt that may be present on the surface. This may be done by having a hydrophobic surface whereby any dirt that is present on the surface can be removed from the surface when a water droplet rolls along the surface, collecting and carrying the dirt with it.

The term 'hydrophobic agent' is to be interpreted broadly to refer to a chemical compound that contains non-polar functional groups, thereby conferring the ability to repel water when coated or applied onto a material.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a polysaccharide based aerogel will now be disclosed.

The polysaccharide based aerogel comprises a network of polysaccharide fibers with pores therebetween, wherein the sizes of the pores are in the micrometer range.

The polysaccharide based aerogel may have an open porous network structure of uniform polysaccharide fibers, indicating that the polysaccharide fibers successfully self-assembled via hydrogen bonding. The polysaccharide based aerogel may have a three-dimensional porous network. The polysaccharide based aerogel may have a stable structure due to the polysaccharide-polysaccharide hydrogen bonding. Hence, even when the polysaccharide based aerogel is subjected to a series of water or oil absorption tests as indicated further below, the shape of the aerogel may still be preserved.

The polysaccharide fibers making up the polysaccharide based aerogel may be sourced or obtained from a recyclable material. The recyclable material may be waste paper. By obtaining polysaccharide fibers such as cellulose fibers from recyclable material, rather than synthesizing the cellulose fibers directly via bioengineering processes or from natural raw materials such as wood pulp, this may be more environmentally friendlier and may aid in reducing carbon footprint.

The polysaccharide making up the polysaccharide based aerogel may be selected from the group consisting of cellulose, lignin, hemicellulose, chitin, arabinoxylan and pectin. In one embodiment, the polysaccharide is cellulose.

The pore sizes of the aerogel may be in the range of about 1 μm to about 1000 μm. The pore sizes of the aerogel may be more than about 20 μm, about 20 μm to about 1000 μm, about 20 μm to about 50 μm, about 50 μm to about 1000 μm, about 30 μm to about 250 μm, about 40 μm to about 200 μm, about 30 μm to about 200 μm, about 40 μm to about 250 μm, about 30 μm to about 50 μm, about 30 μm to about 100 μm, about 30 μm to about 150 μm, about 40 μm to about 50 μm, about 40 μm to about 100 μm, about 40 μm to about 150 μm, about 200 μm to about 1000 μm or about 250 μm to about 1000 μm.

The diameters of the polysaccharide fibers may be in the micrometer range. The diameters of the polysaccharide fibers may be in the range of about 5 μm to about 100 μm, about 8 μm to about 50 μm, about 5 μm to about 50 μm, about 8 μm to about 100 μm, about 5 μm to about 8 μm, about 5 μm to about 10 μm, about 5 μm to about 20 μm, about 5 μm to about 40 μm, about 10 μm to about 20 μm, about 10 μm to about 40 μm, about 10 μm to about 50 μm, about 10 μm to about 60 μm, about 10 μm to about 80 μm, about 10 μm to about 100 μm, about 20 μm to about 50 μm, about 30 μm to about 50 μm, or about 40 μm to about 50 μm.

The length of the polysaccharide fibers may be in the range of about 0.3 mm to about 5 mm, about 1 mm to about 5 mm, about 2 mm to about 5 mm, about 3 mm to about 5 mm, about 4 mm to about 5 mm, about 0.3 mm to about 1 mm, about 0.3 mm to about 2 mm, about 0.3 mm to about 3 mm or about 0.3 mm to about 4 mm.

The polysaccharide based aerogel may have a density of about 0.03 g/cm$^3$ to about 0.08 g/cm$^3$, about 0.04 g/cm$^3$ to about 0.08 g/cm$^3$, about 0.03 g/cm$^3$ to about 0.04 g/cm$^3$, about 0.07 g/cm$^3$ to about 0.08 g/cm$^3$, 0.075 g/cm$^3$ to about 0.08 g/cm$^3$, 0.07 g/cm$^3$ to about 0.075 g/cm$^3$. The polysaccharide based aerogel may have a density of about 0.04 g/cm$^3$ or about 0.078 g/cm$^3$.

The polysaccharide based aerogel may have a porosity in the range of about 94% to about 98%. Due to the porosity of the aerogel, the aerogel may be permeable to gases.

The polysaccharide based aerogel may be flexible. The polysaccharide based aerogel may be deformed by bending the aerogel. Upon removal of the deformation force, the polysaccharide based aerogel may revert back to its original shape easily.

The polysaccharide based aerogel may be mechanically strong. When a load is applied onto the polysaccharide based aerogel, the shape of the polysaccharide based aerogel may be retained under the heavy loading as well as after the load is removed.

The yield strength of the polysaccharide based aerogel may be in the range of about 1000 N/m$^2$ to about 1200 N/m$^2$, about 1100 N/m$^2$ to about 1200 N/m$^2$, about 1000 N/m$^2$ to about 1100 N/m$^2$, or about 1000 N/m$^2$ to about 1080 N/m$^2$. The yield strength of the polysaccharide based aerogel may be about 1080 N/m$^2$. The tensile strength of the polysaccharide based aerogel may be in the range of about 1400 N/m$^2$ to about 1600 N/m$^2$, about 1500 N/m$^2$ to about 1600 N/m$^2$, about 1400 N/m$^2$ to about 1500 N/m$^2$, or about 1400 N/m$^2$ to about 1470 N/m$^2$. The tensile strength of the polysaccharide based aerogel may be about 1470 N/m$^2$.

The Young's modulus of the polysaccharide based aerogel may be in the range of about 10 kPa to about 12 kPa, about 10 kPa to about 11 kPa, or about 11 kPa to about 12 kPa. The Young's modulus of the polysaccharide based aerogel may be about 11 kPa.

The polysaccharide based aerogel may have a low thermal conductivity value. The thermal conductivity of the polysaccharide based aerogel may be in the range of about 0.02 Wm$^{-1}$K$^{-1}$ to about 0.04 Wm$^{-1}$K$^{-1}$, 0.03 Wm$^{-1}$K$^{-1}$ to about 0.04 Wm$^{-1}$K$^{-1}$, 0.02 Wm$^{-1}$K$^{-1}$ to about 0.03 Wm$^{-1}$K$^{-1}$, 0.03 Wm$^{-1}$K$^{-1}$ to about 0.035 Wm$^{-1}$K$^{-1}$, 0.035 Wm$^{-1}$K$^{-1}$ to about 0.04 Wm$^{-1}$K$^{-1}$ or 0.03 Wm$^{-1}$K$^{-1}$ to about 0.032 Wm$^{-1}$K$^{-1}$.

The polysaccharide based aerogel may be hydrophilic and may be able to absorb large quantities of water. The amount of water that can be absorbed by the polysaccharide based aerogel may be at least five times, 5 to 25 times, 5 to 20 times, 7 to 10 times, or 10 to 20 times, the dry weight of the polysaccharide based aerogel.

In order to remove the absorbed water from the polysaccharide based aerogel, the polysaccharide based aerogel may be subjected to a pressure force. The absorbed water may be removed simply by hand squeezing the polysaccharide based aerogel. Hence, the polysaccharide based aerogel may not be subjected to any drying techniques in order to remove the absorbed water, facilitating the ease of removal of absorbed water from the polysaccharide based aerogel. By exerting a pressure on the polysaccharide based aerogel, at least 80%, at least 90%, at least 95%, at least 96%, at least 97%, at least 98%, or at least 99%, or at most 99.9% of the absorbed water may be removed from the polysaccharide based aerogel.

After a first round of absorption, the polysaccharide based aerogel may be used in a second as well as subsequent rounds of absorption. Hence, the polysaccharide based aerogel may be reused. The amount of water absorbed during the second and subsequent rounds of absorption may be lesser than that absorbed in the first round of absorption, and may be at least three times the dry weight of the cellulose aerogel. Similarly to the first round of absorption, the absorbed water may be removed by exerting a pressure on the polysaccharide based aerogel (such as squeezing by hand) and the amount of water removed may be similar or more than that mentioned above.

The polysaccharide based aerogel may be coated with a hydrophobic agent in order to confer a hydrophobic property to the polysaccharide based aerogel. The hydrophobic agent may be coated onto the polysaccharide based aerogel via a physical method or chemical vapour deposition method.

In the physical method, a hydrophobic agent may be sprayed onto the polysaccharide based aerogel or the polysaccharide based aerogel may be dipped into a solution of a hydrophobic agent. The hydrophobic agent may be a siliconate or a polymer. The siliconate may be a alkyl siliconate. The metal siliconate may be potassium methyl siliconate or sodium methyl siliconate. The polymer may be a polyester. The polyester may be nylon polyester.

In the chemical vapour deposition method, the polysaccharide based aerogel and a volatile hydrophobic agent may be placed in an enclosed chamber. The chemical vapour deposition method may not require the use of organic solvents and is hence non-toxic to the environment. The enclosed chamber may then be subjected to one or heat or pressure to allow the vaporization of the hydrophobic agent. As the hydrophobic agent vapour interacts with the polysaccharide based aerogel, the polysaccharide based aerogel may bond or react with the hydrophobic agent.

In the chemical vapour deposition method, the hydrophobic agent may be a silane compound. Hence, the polysaccharide fibers may be functionalized with a silane compound. The silane compound may comprise at least one functional group selected from the group consisting of alkenyl, alkyl, alkoxy, benzyl, acryloxy, amino, ureide, sulfide, isocyanurate, mercapto, and isocyanate.

The silane compound may be selected from the group consisting of methyltrimethoxysilane, vinyltrimethoxysilane, vinyltriethoxysilane, 2-(3,4 epoxycyclohexyl) ethyltrimethoxysilane, 3-Glycidoxypropyl trimethoxysilane, 3-Glycidoxypropyl methyldiethoxysilane, 3-Glycidoxypropyl triethoxysilane, p-Styryltrimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, (aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, N-phenyl-3-aminopropyltrimethoxysilane, tris-(trimethoxysilylpropyl)isocyanurate, 3-ureidopropyltriethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane.

Upon application of the hydrophobic agent, depending on the mode of application, the hydrophobic may form as a coat on the surfaces of the aerogel (via the physical deposition method). The hydrophobic agent may form as a coat on the individual polysaccharide fibers, while retaining the porous structure of the polysaccharide based aerogel (via the chemical vapour deposition method). After the hydrophobic agent is applied to the polysaccharide based aerogel, the polysaccharide based aerogel acquires a hydrophobicity property such that the contact angle of a water droplet placed on the polysaccharide based aerogel changes from less than 90° (indicating hydrophilicity of the uncoated polysaccharide based aerogel) to more than 90° (indicating the hydrophobicity of the coated polysaccharide based aerogel).

The water contact angle may not change substantially even when the polysaccharide based aerogel exposed to environmental conditions such as air and/or sunlight for a number of days. Hence, this indicates the excellent water-repellent durability of the coated polysaccharide based aerogel and resistance against environmental factors.

The application of a hydrophobic agent may not substantially alter the physical properties of the coated polysaccharide based aerogel. Hence, the flexibility, thermal and mechanical properties of the polysaccharide based aerogel may not adversely change after the application of the hydrophobic agent. In one embodiment, the thermal conductivity of the polysaccharide based aerogel may be improved after coating with a hydrophobic agent via chemical vapour deposition method.

Due to the application of the hydrophobic agent, the coated polysaccharide based aerogel may be able to absorb large quantities of a non-polar liquid such as oil. The oil absorbance capacity of the coated polysaccharide based aerogel may be at least 10 times, 10 to 25 times, 15 to 25 times, 20 to 25 times, 17 to 19 times, or 18 to 20 times, the dry weight of the coated polysaccharide based aerogel. The capability of the coated polysaccharide based aerogel to absorb such large quantities of a non-polar liquid may be due to the presence of the micron-sized pores within the aerogel, allowing the non-polar liquid to diffuse into the large pores. Without being bound by theory, the inventors have found that the oil absorption capacity of the coated polysaccharide based aerogel increases when the viscosity of the oil decreases. When the viscosity is low, the oil may be able to penetrate easily into the porous network of the coated polysaccharide based aerogel, resulting in a higher oil absorption capacity. The temperature of the oil may be modified to selectively control, the viscosity of the oil such that the viscosity is simultaneously low enough to facilitate the penetration of the oil into the micron-sized pores while being high enough for the oil to be retained in the structure of the coated polysaccharide based aerogel.

Similarly to the water absorption capability of the (uncoated) polysaccharide based aerogel mentioned above, the absorbed oil may be removed from the coated polysaccharide based aerogel by exerting a pressure on the coated polysaccharide based aerogel (such as squeezing by hand). In addition, the polysaccharide based cellulose aerogel may be reused for absorbing oil.

The coated polysaccharide based aerogel may be used to absorb a non-polar liquid from a mixture of polar and non-polar liquids. Hence, where the non-polar liquid is oil, the coated polysaccharide based aerogel may be used in oil remediation to clean up oil spills from seawater.

Exemplary, non-limiting embodiments of a method for forming a polysaccharide based aerogel will now be disclosed.

The method may comprise the steps of (a) dissolving polysaccharide fibers from a recyclable material in a polysaccharide solvent in the presence of sound energy to form a polysaccharide dispersion; and (b) forming the polysaccharide dispersion into the aerogel.

Sound energy may be used as it is powerful and may be effective in cutting the bonds between the recycled cellulose fibers.

Where the polysaccharide is cellulose, the polysaccharide solvent is a cellulose solvent. The cellulose solvent may be selected from the group consisting of viscose, a copper ammonia liquid, N-methylmorpholine oxide, a solution obtained by adding a halogenated alkali (such as LiCl, etc) to an aprotic polar solvent (such as N,N-dimethylacetamide, etc), and an aqueous solution of alkali with urea or thiourea.

In the aqueous solution of alkali with urea or thiourea, the alkali may be sodium hydroxide or potassium hydroxide. The concentrations of the alkali and the urea may not be specifically limited and may be adjusted as required. As a guideline, the concentration of the alkali may be in the range of about 1 wt % to about 5 wt %, about 1.5 wt % to about 3 wt %, about 1.5 wt % to about 5 wt %, about 1 wt % to about 2 wt %, or about 1.5 wt % to about 2 wt %. The concentration of the urea may be in the range of about 5 wt % to about 25 wt %, about 5 wt % to about 20 wt %, about 10 wt % to about 25 wt %, about 10 wt % to about 20 wt %, about 10 wt % to about 13 wt %, about 13 wt % to about 25 wt %, or about 13 wt % to about 14 wt %, based on the total weight of the mixture.

The concentration of the recycled polysaccharide fibers in the polysaccharide solvent is also not specifically limited and may be adjusted as required. As a guideline, the concentration of the recycled polysaccharide fibers in the polysaccharide solvent may be in the range of about 1 wt % to about 5 wt %, about 2 wt % to about 5 wt %, about 1 wt % to about 2 wt %, about 1.2 wt % to about 4 wt %, about 1 wt % to about 4 wt %, about 1.2 wt % to about 5 wt %, or about 2 wt % to about 4 wt %, based on the total weight of the mixture.

The sound energy may be provided by a sonicator. The frequency of the sonicator may be selected from about 15 Hz to about 30 Hz, about 20 Hz to about 25 Hz, about 15 Hz to about 25 Hz or about 20 Hz to about 30 Hz. The sonicator may have a power value selected from the range of about 1500 W to about 2000 W, about 1500 W to about 1800 W or about 1800 W to about 2000 W. The power of the sonicator may be about 1800 W. A sonicator may be required to dissolve or disperse the recycled polysaccharide fibers in the polysaccharide solvent. The sonicator may be applied for a period of time selected from about 5 minutes to about 10 minutes, about 6 minutes, 7 minutes, 8 minutes, or 9 minutes. These time periods serve as a guideline and the actual time taken may be dependent on the speed of dissolution/dispersion of the recycled polysaccharide fibers in the polysaccharide solvent.

In order to form the polysaccharide dispersion into the aerogel, step (b) may comprise the steps of (c) forming the polysaccharide dispersion into a gel; and (d) drying the polysaccharide gel to form the aerogel.

The polysaccharide dispersion may be formed into a gel by lowering the temperature of the polysaccharide dispersion. This may be done by placing the polysaccharide in a refrigerator for gelation to occur.

Once gelation occurs, the gel may be thawed and then subjected to coagulation. Coagulation may aid in strengthening the gel structure. The gel may be coagulated by placing the gel in a coagulation solvent such as water, an acidic solution, an alcohol or a ketone. The acidic solution is not particularly limited and may be selected from the group consisting of hydrochloric acid, sulphuric acid, nitric acid, citric acid and acetic acid. The alcohol is not particularly limited and may be selected from the group consisting of methanol, ethanol, isopropanol and butanol. The ketone is not particularly limited and may be selected from acetone.

After coagulation, solvent exchange may be carried out to remove the coagulation solvent from the gel and thereby allow the ingress of a medium that can be suitable for freeze drying or supercritical drying. Hence, drying step (d) may comprise freeze-drying or supercritical drying.

Where the polysaccharide gel is to be subjected to freeze drying, the medium may be water. The gel may be immersed in water for solvent exchange. The solvent exchange may be carried out for a few days, for example. Once the solvent exchange is complete, the gel may be frozen. The frozen gel may then be subjected to a freeze-drying in drying step (d) to form the polysaccharide aerogel. Freeze-drying is undertaken to dry the gel without destroying the structure. Here, the pressure of the frozen gel is reduced to allow the frozen water in the gel to sublimate directly from the solid ice phase to the gas phase, forming pores in the process. Freeze-drying creates minimal force on the pore walls of the aerogels and thereby aids in preventing the collapse of the porous structure.

Where the polysaccharide gel is to be subjected to supercritical drying, the medium may be liquid carbon dioxide. The liquid carbon dioxide is then heated until its temperature goes beyond the critical point, at which time the pressure can be gradually released, allowing the gas to escape from the gel, forming pores in the process, ending up with the dried aerogel.

The method may optionally exclude the use of cross-linkers to cross-link the individual polysaccharide fibers together as the polysaccharide fibers are able to self-assemble to form the porous network of the aerogel via polysaccharide-polysaccharide hydrogen bonding. Where the polysaccharide is cellulose, the cellulose fibers self-assemble via cellulose-cellulose hydrogen bonding.

The method may be scaled up easily for large scale production. The polysaccharide dispersion may be placed in a suitable mold during gelation to obtain the resultant aerogel having a desired shape and size.

In order to form a hydrophobic polysaccharide based aerogel, a method comprising the following steps may be used: (a) dissolving polysaccharide fibers from a recyclable material in a polysaccharide solvent in the presence of sound energy to form a polysaccharide dispersion; (b) forming the polysaccharide dispersion into the aerogel; and (c) coating the aerogel with a hydrophobic agent.

Hence, steps (a) and (b) as well as the associated steps of forming the polysaccharide dispersion into a gel and drying the gel to form the aerogel as discussed above similarly apply here.

The step of coating the aerogel with a hydrophobic agent may be carried out via a physical deposition method or a chemical vapour deposition method as already discussed before. The chemical vapour deposition method may be carried out under exemplary conditions of a temperature of about 60° C. to about 80° C., or about 70° C. and a time period of about 1 to about 3 hours, or about 2 hours.

The method may additionally comprise the step of removing excess hydrophobic agent from the coated hydrophobic aerogel. This may be achieved by placing the coated hydrophobic aerogel in a vacuum oven until the pressure reaches a desired value.

Exemplary, non-limiting embodiments of a reusable absorbent will now be disclosed.

The reusable absorbent comprises a polysaccharide based aerogel having a network of polysaccharide fibers with pores therebetween, wherein the sizes of the pores are in the micrometer range.

As mentioned above, the polysaccharide based aerogel (when not coated with a hydrophobic agent) may be used to absorb a polar liquid such as water. The polysaccharide based aerogel (when coated with a hydrophobic agent) may be used to absorb a non-polar liquid such as oil.

The absorbance capacity of the polysaccharide based aerogel absorbent depends on the type of liquid to be absorb (polar or non-polar) and may be typically up to 25 times the dry weight of the absorbent.

The absorbent may be reusable for at least three times. The absorbent may be reused once the absorbed liquid is removed from the absorbent. The absorbent may be subjected to a pressure force (such as squeezing by hand) to remove any absorbed liquid therein, thereby allowing the absorbent to be reused.

There is also provided use of a polysaccharide based aerogel having a network of polysaccharide fibers with pores therebetween, wherein the pore sizes are in the micrometer range, for absorbing a non-polar liquid. The non-polar liquid may be absorbed from a mixture of polar and non-polar liquids. The non-polar liquid may be oil.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 6(a) is a photographic image showing the experimental set-up of an oil absorption test using MTMS-coated recycled cellulose aerogel in Oil (1). FIG. 6(b) is a photographic image of the aerogel of FIG. 6(a) after the oil absorption test. FIG. 6(c) is a photographic image showing the experimental set-up of an oil absorption test using MTMS-coated recycled cellulose aerogel in Oil (2). FIG. 6(d) is a photographic image of the aerogel of FIG. 6(c) after the oil absorption test.

FIG. 7(a) is a photographic image of the top view of a MTMS-coated recycled cellulose aerogel immediately upon contact with an oil (time=0). FIG. 7(b) is a photographic image showing the aerogel immersed in the oil of FIG. 7(a) at a time period of 1 minute. FIG. 7(c) is a photographic image showing the aerogel immersed in the oil of FIG. 7(a) at a time period of 3 minutes.

EXAMPLES

Non-limiting examples of the invention and a comparative example will be further described in greater detail by reference to specific Examples, which should not be construed as in any way limiting the scope of the invention.

Example 1

Synthesis of Cellulose Aerogels

Figure 1A:
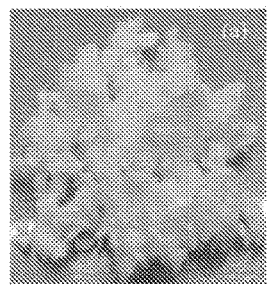
FIG. 1(a) is a photographic image of recycled cellulose fibers obtained from waste paper.

The raw material used for the synthesis of cellulose aerogels was recycled cellulose fibers (see FIG. 1(a)) from paper waste. Recycled cellulose fibers were obtained from Insul-Dek Engineering Pte. Ltd. of Singapore. Recycled cellulose fibers (1.2 to 4 wt %) was dispersed in sodium hydroxide/urea solutions (1.5 to 3 wt % of NaOH with 10 to 20 wt % of urea, both chemicals obtained from Sigma-Aldrich of Missouri of the United States of America) by sonicating for 6 minutes. A probe sonicator was used for sonicating the mixture at a frequency of 20 to 25 kHz and at a power of 1800 W.

After sonication, the solution was placed in a refrigerator at a temperature of −14° C. for more than 24 hours to allow gelation of the solution. After the solution has formed a gel, it is then thawed at room temperature (of about 25° C.) and then followed by immersing into ethanol (99%) which functions as a coagulation solvent for coagulation. In order to control the thickness of the aerogel, a beaker was used as a mold to control the thickness at 1 cm and a diameter of 3.5 cm.

Figure 1B:
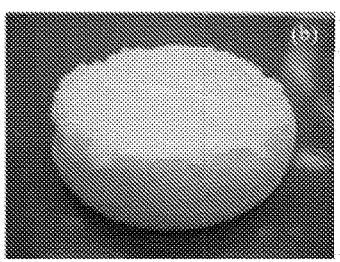
FIG. 1(b) is a photographic image of recycled cellulose aerogel made in accordance with Example 1.

After coagulation, solvent exchange was carried out by immersing the gel in de-ionised water for 2 days. To dry the sample without destroying the structure, freeze drying was carried out. In this technique, the sample was frozen and the surrounding pressure was reduced to allow the frozen water in the sample to sublimate directly from the solid phase to the gas phase, which creates minimal force on the pore walls of the aerogel, thereby preventing the porous structure from collapsing. Here, the sample was frozen in a freezer at −18° C. for 12 hours. After this, freeze drying was carried out for 2 days with a ScanVac CoolSafe 95-15 Pro freeze dryer (from LaboGene™ of Denmark) to obtain the desired cellulose aerogel, as shown in FIG. 1(b). Referring to FIG. 1(b), a light and porous aerogel was formed after the freeze drying step. The aerogel may also be termed hereinafter as "cellulose aerogel" or "recycled cellulose aerogel".

Figure 1C:
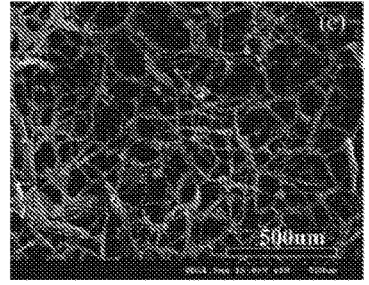
FIG. 1(c) is a field-emission scanning electron microscopic image at a scale bar of 500 μm of the internal structure of the recycled cellulose aerogel.

Field-emission scanning electron microscopy (FE-SEM) was used to investigate the morphology of the cellulose aerogel prepared from recycled cellulose fibers. Here, the sample was kept in a dry cabinet prior to FE-SEM. The sample was then coated with a thin gold layer using sputtering. A Hitachi 54300 scanning electron microscope (from Hitachi of Japan) operated at ⅕ kV was used to capture structural images of the cellulose aerogel. As seen in FIG. 1(c), the cellulose aerogel has an open porous network structure of uniform fibers (about 8 μm wide), indicating that the recycled cellulose fibers successfully self-assembled via hydrogen bonding to form a three-dimensional (3D) porous network. The width of the recycled cellulose fibers is much larger than that of nanocellulose fibers (2 to 100 nm). From FIG. 1(c), it can be observed that the pore size of the pores in the cellulose aerogel is in the range of 40 to 200 μm, indicating the porous property of the cellulose aerogel. It is to be noted that aerogels formed using nanocellulose fibers are nanoporous, rather than having micron-sized pores.

The cellulose aerogel has a density of 0.078 g/cm$^3$ calculated from the weight (0.9690 g) and volume (12475 mm$^3$) of the cellulose aerogel (please refer to Table 1 below). With a cellulose fiber density of 1.5 g/cm$^3$, the porosity of the cellulose aerogel sample is 94.8%. This value is lower than that of cellulose aerogels made from nanocellulose fibers, probably due to the micron-sized porous structure of the recycled cellulose aerogel compared to the nanoporous network of the nanocellulose aerogel.

Example 2

Water Absorption Capability

Figure 2A:
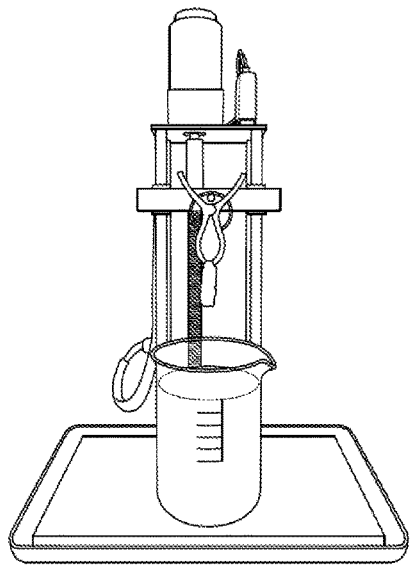
FIG. 2(a) is a photographic image showing the experimental set-up of the water absorption test.

To investigate the water absorption capability of the recycled cellulose aerogel, a water absorption test was performed for a cellulose aerogel sample synthesized from 2% recycled cellulose and 1.9% NaOH/13.76% urea using a home-made dip coater (FIG. 2(a)). The water absorption capability of the aerogel sample was investigated in de-ionized (DI) water using a modified ASTM D570-98. The dry sample dimensions were 38 mm (diameter)×11 mm (thickness). The dry sample was weighed and immersed in 800 ml of DI water for a certain period of time. After the immersion, the wet sample was lifted up at a rate of 200 mm/min with the dip coater of FIG. 2(a). Excess water on the surface of the sample was removed with filter paper.

The wet sample was weighed, the dimensions measured, squeezed and weighed again. The test was repeated three times with an immersion time of 2 hours. The size and weight of the sample were measured before and after each test.

Figure 2B:
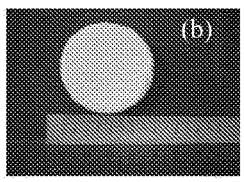
FIG. 2(b) is a photographic image of the dry aerogel sample before the test.
Figure 2C:
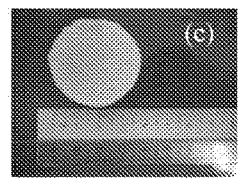
FIG. 2(c) is a photographic image of the wet sample after the first absorption test.
Figure 2D:
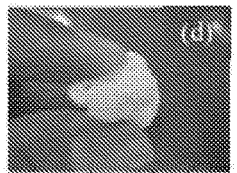
FIG. 2(d) is a photographic image of the squeezed sample after the first test.

FIG. 2(b) shows the dry cellulose aerogel sample before the test while FIG. 2(c) shows the wet sample after the first absorption test. After the first absorption test, it can be seen that there is only a small change in the size of the aerogel sample (comparing FIG. 2(b) and FIG. 2(c)). This is confirmed by the data in Table 1. The ratio of the volume of the sample before and after the first test is only 1.2. However, the sample can hold a large amount of water, up to 7.4 times of its dry weight. It can be seen that the shape of the sample is still preserved after being immersed in water for 2 hours although no cross-linkers were used in the synthesis of the aerogel, indicating that the material has a stable structure due to the cellulose-cellulose hydrogen bonding. The absorbed water remained very well inside the cellulose aerogel without dripping and if not squeezed, the water naturally evaporates from the aerogel under atmospheric conditions in 7 days. As compared to conventional superabsorbent polymers where absorbed water can only be removed by drying, it is easy to remove absorbed water from the recycled cellulose aerogel by squeezing (FIG. 2(d)). This advantage facilitates the reusability of the absorbent aerogel. Assuming that the squeezed sample has a spherical shape, it is observed that its volume is approximately ⅓ that of the original sample. From the weights of the dry, wet and squeezed samples (Table 1), it is found that most of the absorbed water was removed ($m_r$=0.998) after a simple squeezing of the wet sample.

Figure 2E:
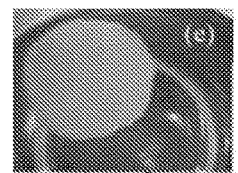
FIG. 2(e) is a photographic image of the squeezed sample in water after the first absorption test (that is, the second water absorption test).
Figure 2F:
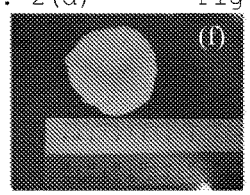
FIG. 2(f) is a photographic image of the wet sample after the second absorption test.

The squeezed aerogel sample was then placed back into water for a second water absorption test (FIG. 2(e)). After half a minute, the squeezed sample nearly recovered its original round shape. This fact demonstrates the fast shape recovery characteristic of the recycled cellulose aerogel. The wet sample was taken out after 2 hours, weighed and the dimensions measured. As shown in FIG. 2(f), the sample shrank compared to the original one (FIG. 2(b)). It is possible that there was a partial collapse of the micron-sized pores of the aerogel during squeezing. This is confirmed by the data in Table 1. The volume ratio of the wet sample after the second water absorption test and the original dry sample is only 0.42. The wet sample was then squeezed again. In the second test, the sample can only absorb a water amount of 3.8 times of its dry weight due to the shrinkage of the porous structure. It is also easy to remove most of the absorbed water this time with a $m_r$ value of 0.998 (Table 1).

The third water absorption test was then carried out. The volume of the wet sample after the third test was similar to that of the wet sample after the second test (Table 1) indicating that no more shrinkage was created in the structure of the aerogel. As a result, the absorbed water amount in the third time was almost the same of that in the second time. A $m_r$ value of 0.999 of the third water absorption test again indicated that nearly all the absorbed water was eliminated after a simple squeezing.

Similar water absorption tests were performed for other aerogel samples synthesized by changing synthesis parameter values as stated in Example 1. The highest water uptake content of 20 g/g was achieved with the cellulose aerogel produced from 2% cellulose and 1.9% NaOH/10% urea. This water absorption capability is comparable to those of commercial water sorbents.

size of the cellulose aerogel sample was 38 mm (diameter) by 11 mm (thickness). The sample was compressed at a rate of 1 mm/min.

Figure 3A:
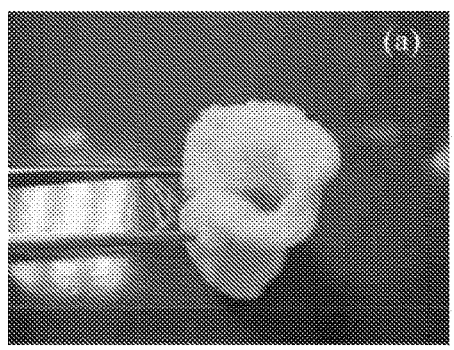
FIG. 3(a) is a photographic image of a bent aerogel showing the flexibility of the aerogel.
Figure 3B:
FIG. 3(b) is a photographic image of the experimental set-up of the mechanical strength test in which a load of 200 g was applied to the aerogel.
Figure 3C:
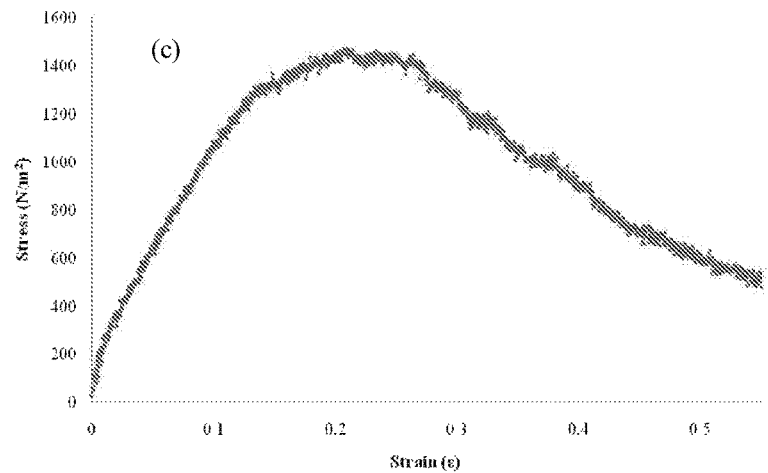
FIG. 3(c) is the tensile curve of the aerogel.

From FIG. 3(c), it can be seen that the yield strength and tensile strength of the aerogel are about 1080 N/m² and 1470 N/m², respectively, with a Young's modulus of 11 kPa.

Example 4

Thermal Studies

Figure 4A:
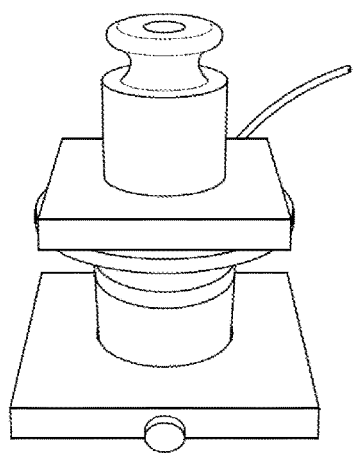
FIG. 4(a) is a photographic image of the experimental set-up of the thermal conductivity test.

To investigate the thermal insulation ability of the recycled cellulose aerogel, a thermal conductivity measurement was carried out at room temperature with a C-Therm TCi Thermal Conductivity Analyser System (FIG. 4(a)) (from C-Therm Technologies Ltd of Canada) on a cellulose aerogel sample synthesized from 1.2 wt % recycled cellulose fibers and 1.5 wt % NaOH/10 wt % urea, sonicated for 6 minutes. The sensor of the equipment was placed on a stable and flat table with the sensor head facing upwards. The

TABLE 1

Data obtained from the water absorption test of Example 2

| | $m_d$, g | $m_w$, g | $m_s$, g | $m_u$ | $m_r$ | $d_d$, mm | $t_d$, mm | $d_w$, mm | $t_w$, mm | $d_s$, mm | $v_d$, mm³ | $v_w$, mm³ | $v_s$, mm³ | $r_{v1}$ | $r_{v2}$ |
|---|---|---|---|---|---|---|---|---|---|---|---|---|---|---|---|
| 1st absorption | 0.9690 | 8.1315 | 0.9840 | 7.4 | 0.998 | 38 | 11 | 40 | 12 | 23 | 12475 | 15080 | 4247 | 1.20 | 0.34 |
| 2nd absorption | | 4.6447 | 0.9765 | 3.8 | 0.998 | | | 31 | 7 | 21 | | 5283 | 3232 | 0.42 | 0.26 |
| 3rd absorption | | 4.8530 | 0.9712 | 4.0 | 0.999 | | | 30.5 | 7 | 21 | | 5114 | 3232 | 0.41 | 0.26 |

$m_d$: weight of dry sample;
$m_w$: weight of wet sample;
$m_s$: weight of squeezed sample;
$m_u$: water uptake content;
$m_r$: water content removed after squeezing;
$d_d$: diameter of dry sample;
$t_d$: thickness of dry sample;
$d_w$: diameter of wet sample;
$t_w$: thickness of wet sample;
$d_s$: diameter of squeezed sample;
$v_d$: volume of dry sample;
$v_w$: volume of wet sample;
$v_s$: volume of squeezed sample;
$r_{v1}$: volume ratio $v_w/v_d$;
$r_{v2}$: volume ratio $v_s/v_d$ Example 3

Flexibility of Cellulose Aerogel

To investigate the flexibility of the recycled cellulose aerogel, a test was performed on a cellulose aerogel sample synthesized from 1.2 wt % recycled cellulose fibers and 1.5 wt % NaOH/10 wt % urea, sonicated for 6 minutes. As shown in FIG. 3(a), the cellulose aerogel can be easily and repeatedly bent 180 degrees without damaging the shape of the sample.

A qualitative test was performed for the cellulose aerogel sample to investigate its mechanical strength by loading a 200 g weight on the sample (FIG. 3(b)). It can be seen that the aerogel did not change its shape under the heavy loading.

Figure 3D:
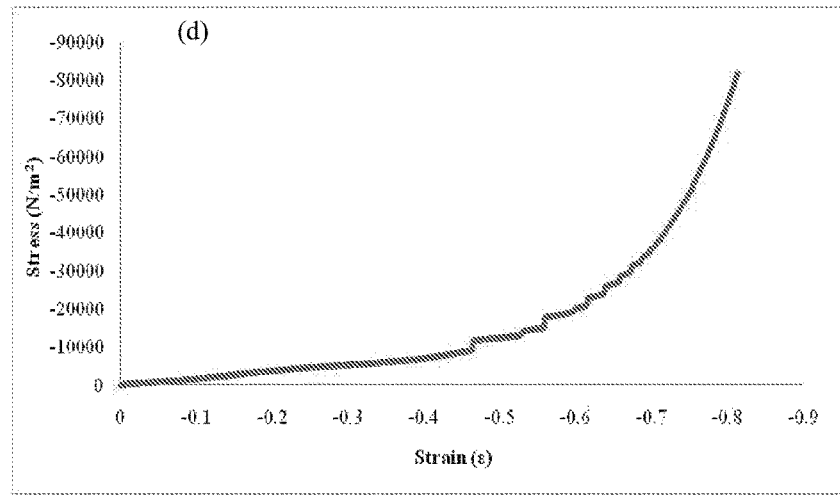
FIG. 3(d) is the compressive curve of the aerogel.

For further understanding of the mechanical property of the cellulose aerogel, tensile and compression tests were performed with an Instron® 5500 microtester (from Instron® of Massachusetts of the United States of America) and the results are shown in FIG. 3(c) and FIG. 3(d). The sample was placed directly on the top of the sensor with a loaded weight to ensure a good surface contact between the sample and the sensor. The measured thermal conductivity of the cellulose aerogel sample was 0.032 Wm⁻¹K⁻¹, which is comparable to those of good insulation materials such as silica aerogel (0.026 Wm⁻¹K⁻¹) and wool (0.03 to 0.04 Wm⁻¹K⁻¹). This low thermal conductivity value and the low cost of paper waste make the recycled cellulose aerogel promising for thermal insulation applications.

Figure 4B:
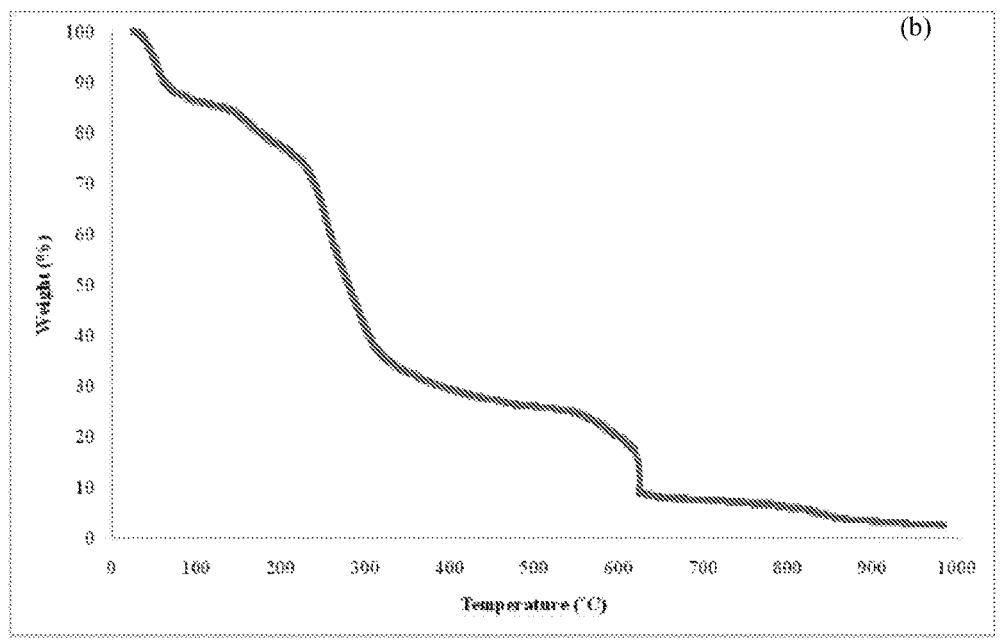
FIG. 4(b) is a curve showing the thermogravimetric analysis of the recycled cellulose aerogel.

To evaluate the thermal stability of the cellulose aerogel, a thermogravimetric analysis (TGA) test was performed for the sample in air. A Shimadzu DTG60H (from Shimadzu Corporation of Japan) was used to determine the weight loss in relation to the temperature. The sample was heated up to 150° C. for 1 hour to ensure that the adsorbed water in specimen was removed. The specimen was then heated to 1000° C. at a rate of 5° C./min in air. Referring to FIG. 4(b), it can be seen that there was a weight loss of about 23% in the temperature range of 25 to 230° C. due to the removal of absorbed water and some traces of urea left in the sample. A weight loss of 42% can be seen in the range of 230 to 330°

C. due to the degradation and burning of the cellulose aerogel structure. There was a small drop in the weight of the sample in the range of 550 to 630° C. possibly due to the oxidation of some stable local structures of the aerogel.

Example 5

Hydrophobic Cellulose Aerogel

Figure 5A:
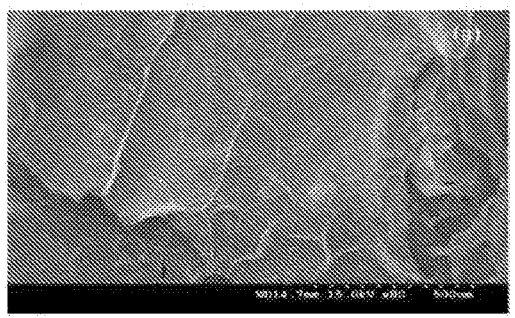
FIG. 5(a) is a scanning electron microscopic (SEM) image at a scale bar of 500 μm showing a cellulose aerogel coated with a commercial water repellent agent.

Cellulose aerogels synthesized from the method of Example 1 were used to develop hydrophobic recycled cellulose aerogels. Here, the cellulose aerogels were synthesized from 1.2 wt % recycled cellulose fibers and 1.5 wt % NaOH/10 wt % urea, sonicated for 6 minutes For water repellent coating, two different coating methods—physical and chemical, were used. In the physical coating method, a commercial water repellent spray (ReviveX® Nubuck, obtained from Gear Aid of McNett Corporation of Washington of the United States of America) was used to spray the dried aerogel from a. distance of 15 cm and then left to dry for one day at room temperature. As shown in FIG. 5(a), the surface of the aerogel was covered by the water repellent polymer and all the pores on the surface (but not within the structure) were fully covered.

Figure 5B:
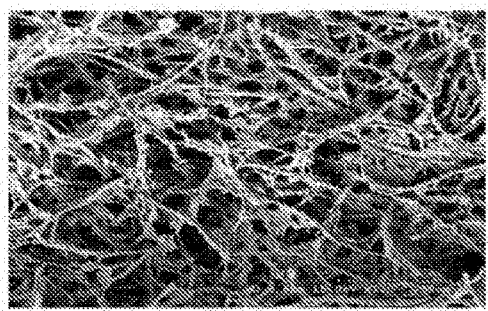
FIG. 5(b) is a SEM image at a scale bar of 250 μm showing a cellulose aerogel coated with methytrimethoxysilane (MTMS).

In the second method—the chemical method (chemical vapor deposition method), a recycled cellulose aerogel sample was placed in a big glass bottle. A small open glass vial containing methyltrimethoxysilane (MTMS) was added into the glass bottle. The glass bottle was then capped and heated in an oven at 70° C. for 2 hours for the silanation reaction. After that, the coated sample was placed in a vacuum oven to remove the excess coating reagent until the pressure reaches 0.03 mbar. As shown in FIG. 5(b), in contrast to FIG. 5(a), the MTMS-functionalized sample still had a porous structure.

After being coated with MTMS, the MTMS-coated aerogel shows a thermal conductivity value of 0.029 $Wm^{-1}K^{-1}$, which is lower than the thermal conductivity of the uncoated sample (0.032 $Wm^{-1}K^{-1}$), indicating an improvement in the thermal insulation property due to the MTMS coating.

Figure 5C:
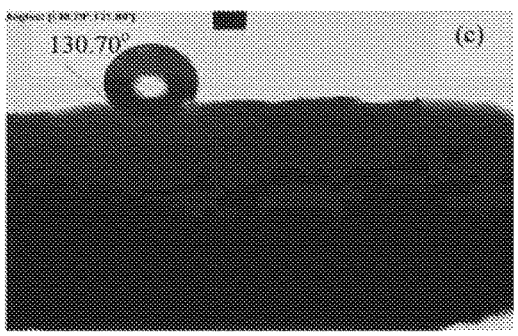
FIG. 5(c) is an image showing the water contact angle measurement of the sample of FIG. 5(a).
Figure 5D:
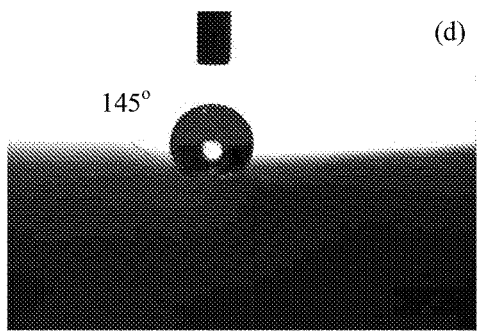
FIG. 5(d) is an image showing the water contact angle measurement of the sample of FIG. 5(b).
Figure 5E:
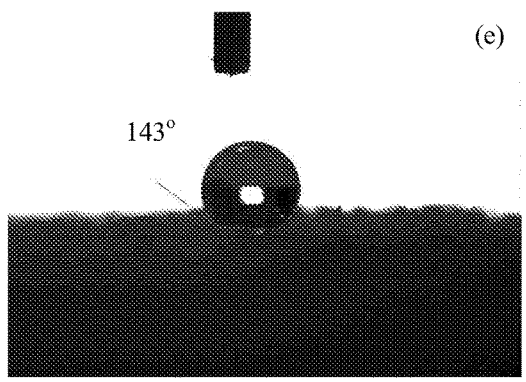
FIG. 5(e) is an image showing the water contact angle measurement of the sample of FIG. 5(d), when cut open.

Water contact angle measurements were performed for the original uncoated sample and the coated samples. Here, a VCA Optima goniometer (from AST Products Inc. of Massachusetts of the United States of America) was used to investigate the water repellency of the uncoated and coated samples. Water was dispensed, drop by drop, using the syringe control of the machine. This was repeated at different positions of the sample and an average was taken. The test was also carried out for coated samples that were left in the atmosphere for several days. For the uncoated sample, water was easily absorbed by the aerogel due to the hydrophilic nature of cellulose. As can be seen in FIG. 5(c), the physically-coated sample had a water contact angle of 130.7°, which was smaller than that of the chemically-coated sample, which had a water contact angle of 145° (FIG. 5(d)). This indicated that the MTMS coating was more water-repellent than the coating with the commercial agent. To ensure that the internal surface of the pores were fully coated with MTMS, the sample was cut into two pieces and a water contact angle of 143° was obtained on the cut surface of the sample (FIG. 5(e)), proving that substantially the entire porous structure was hydrophobic.

Figure 5F:
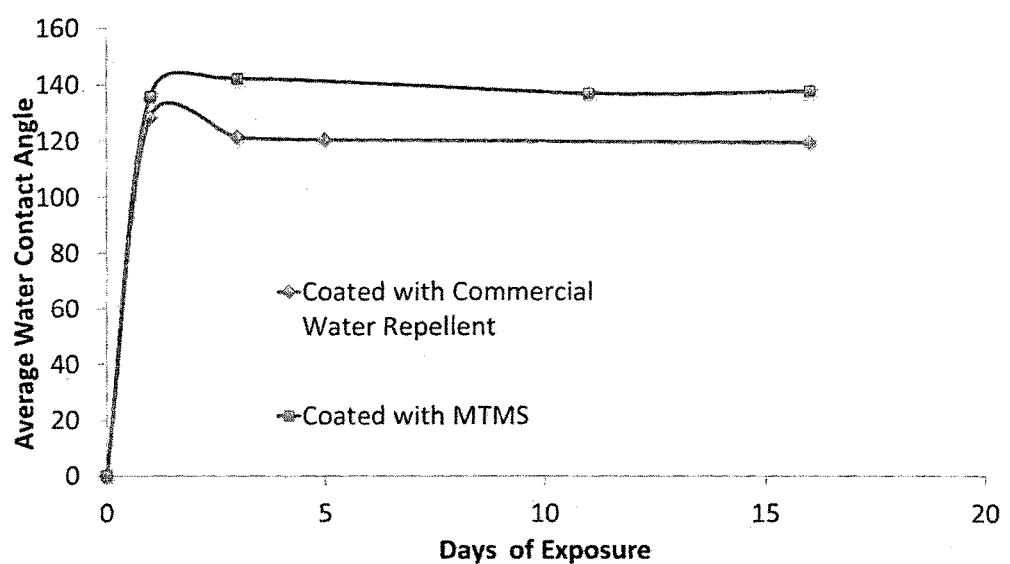
FIG. 5(f) is a graph showing the effect of exposure time on the average water contact angle.

The samples were then exposed in air and sunlight for several days and their water contact angles were measured during the exposure time (FIG. 5(f)). It can be seen that both samples showed little changes in water contact angle, indicating their excellent water-repellent durability.

Example 6

Oil Absorption Test

The chemically-coated hydrophobic sample from Example 5 was used to test the affinity to oil. When the material was coated with MTMS, it will become hydrophobic and oleophilic and therefore, has a good affinity to oil. The MTMS-coated recycled cellulose aerogel was used for the oil absorption test based on a modified ASTM F726-06. The oil absorption test was similar to the water absorption test except that 300 ml of oil was used and that the excess oil was allowed to drain for 30 seconds to 1 minute after lifting up the wet sample. The wet sample was weighed, the dimensions measured, squeezed by hand and weighed again. The test was repeated several times for a total of 5 cycles.

Five types of oils were used for the absorption test: (1) a motor oil, (2) cooking oil, (3) Ruby (RB), (4) Te Giac Trang (TGT) and (5) Rang Dong (RD). The specifications of these oils are shown in Table 2. Oils (1) and (2) were purchased commercially while oils (3) to (5) were supplied from Petrovietnam Research and Development Center for Petroleum Processing (PVPro).

TABLE 2

Specifications of Oil Samples

| Oil | Density at 25° C., g/cm³ | Viscosity, Pa · s | | | |
|---|---|---|---|---|---|
| | | 10° C. | 25° C. | 40° C. | 60° C. |
| (1) | n/a | n/a | 0.13 | n/a | n/a |
| (2) | n/a | n/a | 0.06 | n/a | n/a |
| (3) | 0.8236 | 42 | 0.0090 | 0.0049 | 0.0027 |
| (4) | 0.8264 | n/a | 0.0088 | n/a | n/a |
| (5) | 0.8153 | n/a | 0.0062 | n/a | n/a |

Crude oil absorption capacity was calculated using the following formula:

$$Q_t = \frac{m_w - m_d}{m_d} \quad (1)$$

where $Q_t$ (g/g) is the crude oil absorption capacity of the aerogel at a certain time t (min)

$m_w$ (g) is the weight of the aerogel after absorption $m_d$ (g) is the weight of the aerogel before absorption The ratio of the sample volume before absorption test and its original volume ($V_n$) was calculated as below:

$$V_n = \frac{V_d}{V_i} \quad (2)$$

where $V_d$ (mm³) is the volume the sample before absorption test $V_i$ (mm³) is the original volume of the sample The squeezed ratio of crude oil ($Q_s$) was calculated using equation (3):

$$Q_s = \frac{\text{Squeezed amount of oil}}{\text{Absorbed amount of oil}} = \frac{m_w - m_s}{m_w - m_d} \quad (3)$$

where $m_s$ (g) is the weight of the aerogel after squeezing.

The MTMS-coated aerogels were first investigated using Oils (1) and (2). Referring to FIG. 6(a) and FIG. 6(c), these figures show the aerogel samples being dipped into Oil (1) and Oil (2), respectively using a dip coater. FIG. 6(b) and FIG. 6(d) then show the aerogels after the oil absorption test using Oil (1) and Oil (2) respectively. It was determined that the MTMS-coated aerogels show strong affinities to both Oils (1) and (2) with high oil absorption capacities of 18 and 17.6 g/g, respectively.

The MTMS-coated aerogels were then investigated using Oils (3) to (5). FIG. 7(a) to FIG. 7(c) is a succession of photographs showing the sorption process based on Oil (3) from the start (FIG. 7(a)) to 1 minute (FIG. 7(b)) to 3 minutes (FIG. 7(c)). It was seen that the aerogel easily absorbed crude oil and completely immersed into the oil after about 3 minutes indicating the high crude oil affinity of the aerogel as an oil absorbent.

Figure 8:
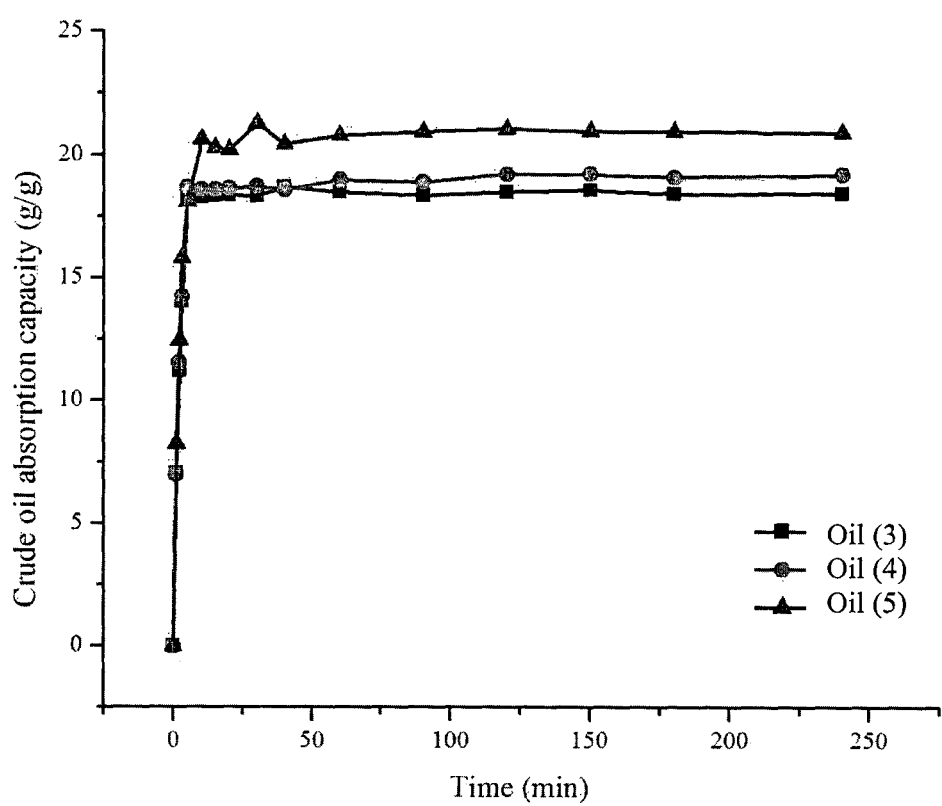
FIG. 8 is a graph showing the absorption kinetics of the various oils on the coated aerogel.

The sorption kinetics of the Oils (3) to (5) on the aerogel are shown in FIG. 8. The absorption rates are very high at the first stage and saturation is achieved after about 20 minutes. The maximum absorption capacities (calculated by Equation 1) of Oil (3), Oil (4) and Oil (5) on the aerogel are 18.4, 18.5 and 20.5 g/g, respectively. These values are nearly double those obtained with polypropylene fibrous mats which are widely used as absorbents for crude oil spill cleaning. The highest absorption capacity value is found for Oil (5) while the aerogel shows similar oil absorption behavior for Oil (3) and Oil (4). This is probably due to the fact that Oil (5) possesses the lowest viscosity while Oils (3) and (4) have comparable viscosity values (Table 2).

It appears that the oil viscosity plays a main role in the absorption capacities of Oils (3) to (5). A lower viscosity may facilitate the penetration of the oil into the porous network of the aerogel and thus, results in a higher oil absorption capacity.

Figure 9:
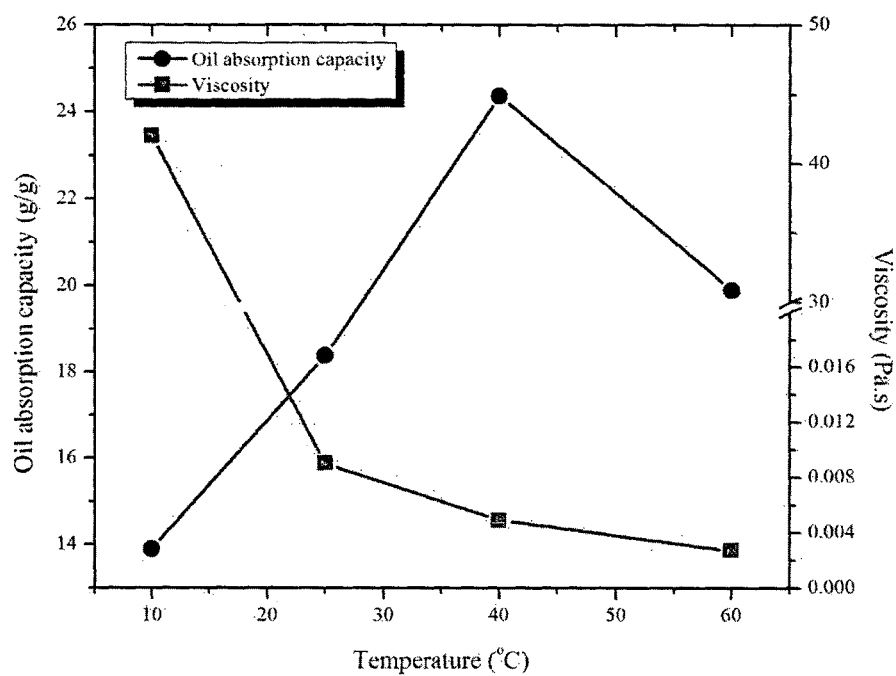
FIG. 9 is a graph showing the effect of temperature on oil absorption capability of a MTMS-coated recycled cellulose aerogel and on the viscosity of Oil (3).

An investigation into the effects of temperature on the crude oil absorption capability of the MTMS-coated recycled cellulose aerogel was examined with Oil (3) at 10, 25, 40 and 60° C. As shown in FIG. 9, the oil absorption capacity increases from 13.9 to 18.4 g/g when increasing temperature from 10 to 25° C., achieving the highest value of 24.4 g/g at 40° C., which decreases to 19.9 g/g when the temperature increases to 60° C. This can be explained based on the change of oil viscosity with temperature, as displayed in FIG. 9 and Table 2. At 10° C., the oil forms a gel with a high viscosity value of 42 Pa·s. This high viscosity inhibits the diffusion of the oil into the pores of the aerogel, leading to a low absorption capacity. When the testing temperature was increased to 25, 40 and 60° C., the viscosity of the crude oil decreased from 42 to 0.0090, 0.0049 and 0.0027 Pa·s. The reduction in the viscosity allowed the oil to diffuse into the porous matrix of the aerogel faster and more easily. However, the large decrease of the oil viscosity at 60° C. may have resulted in a low adherence of the oil to the pore walls and as a consequence, more oil was drained out during the drainage step. The maximum oil absorption capacity was achieved at 40° C., at which the low oil viscosity value facilitated the penetration of the crude oil into the pores and was also high enough for the retention of oil in the structure of the aerogel.

Figure 10A:
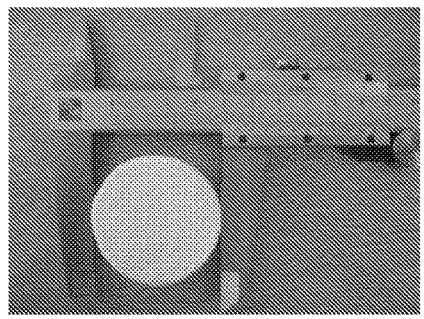
FIG. 10(a) is a photographic image showing a MTMS-coated recycled cellulose aerogel before the first oil absorption test.
Figure 10B:
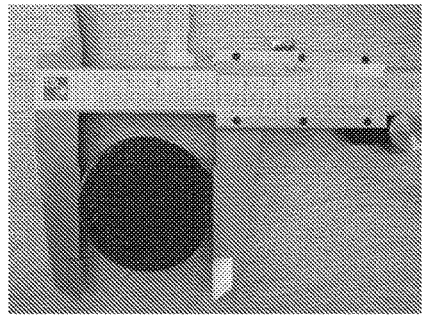
FIG. 10(b) is a photographic image of the cellulose aerogel of FIG. 10(a) but after the first absorption test.
Figure 10C:
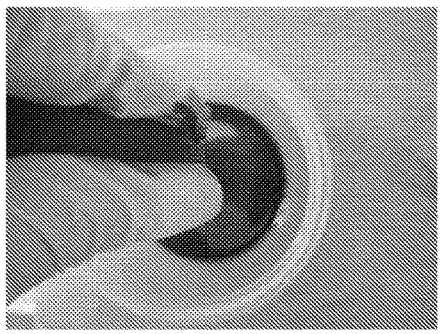
FIG. 10(c) is a photographic image showing the squeezing of the cellulose aerogel of FIG. 10(b).
Figure 10D:
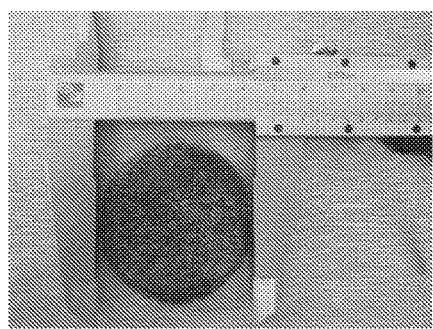
FIG. 10(d) is a photographic image of the squeezed cellulose aerogel of FIG. 10(c).
Figure 10E:
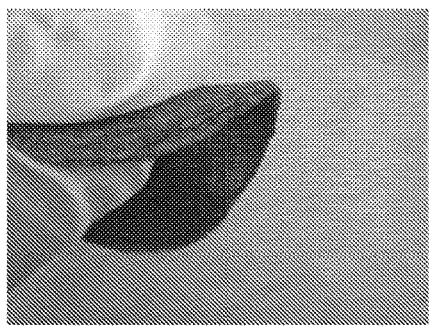
FIG. 10(e) is a photographic image of the showing the flexibility of the squeezed cellulose aerogel of FIG. 10(c).

The effect of test cycles of sorption on the oil absorption capacity of the aerogel was investigated. FIG. 10(a) and FIG. 10(b) show photographic images of the aerogel sample before and after the first oil absorption test cycle. From FIG. 10(a), it can be seen that the diameter of the aerogel sample was 45.0 mm before the oil absorption test while from FIG. 10(b), the diameter of the aerogel sample was 45.2 mm after the oil absorption test. It can be seen that the size of the sample was nearly unchanged after absorbing oil. This was confirmed by a volume ratio of 1.05 found for the aerogel. To remove the absorbed oil, a simple squeezing was performed (FIG. 10(c)). FIG. 10(d) and FIG. 10(e) show the aerogel after squeezing and the good flexibility of the aerogel, respectively. The squeezed aerogel was then used for the next absorption test cycle.

Figure 11A:
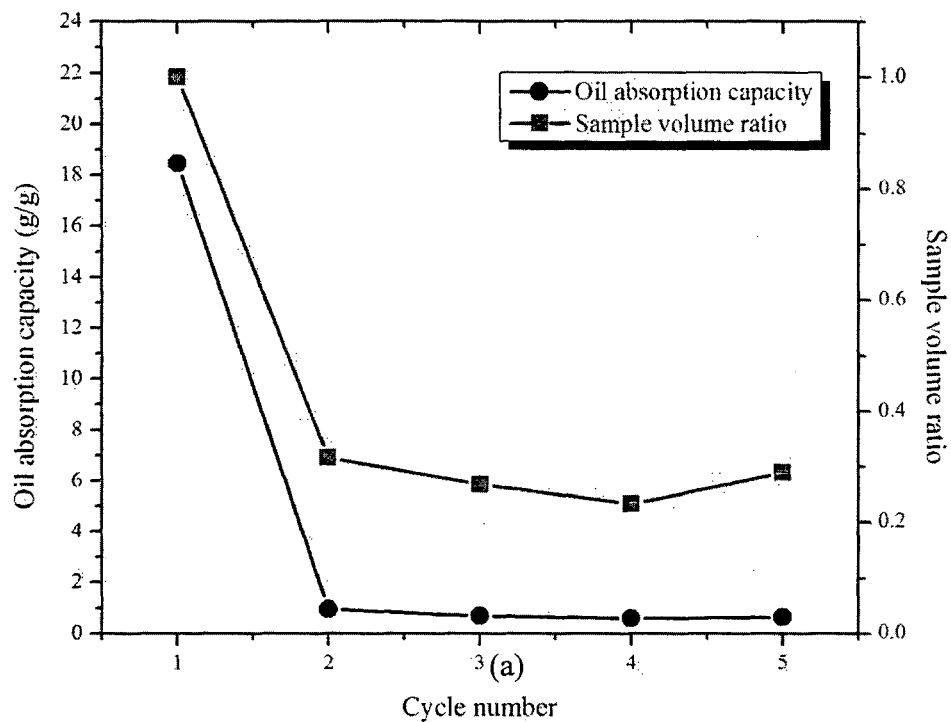
FIG. 11(a) is a graph showing the effect of sorption cycles on the oil absorption capacity and sample volume of the aerogel.
Figure 11B:
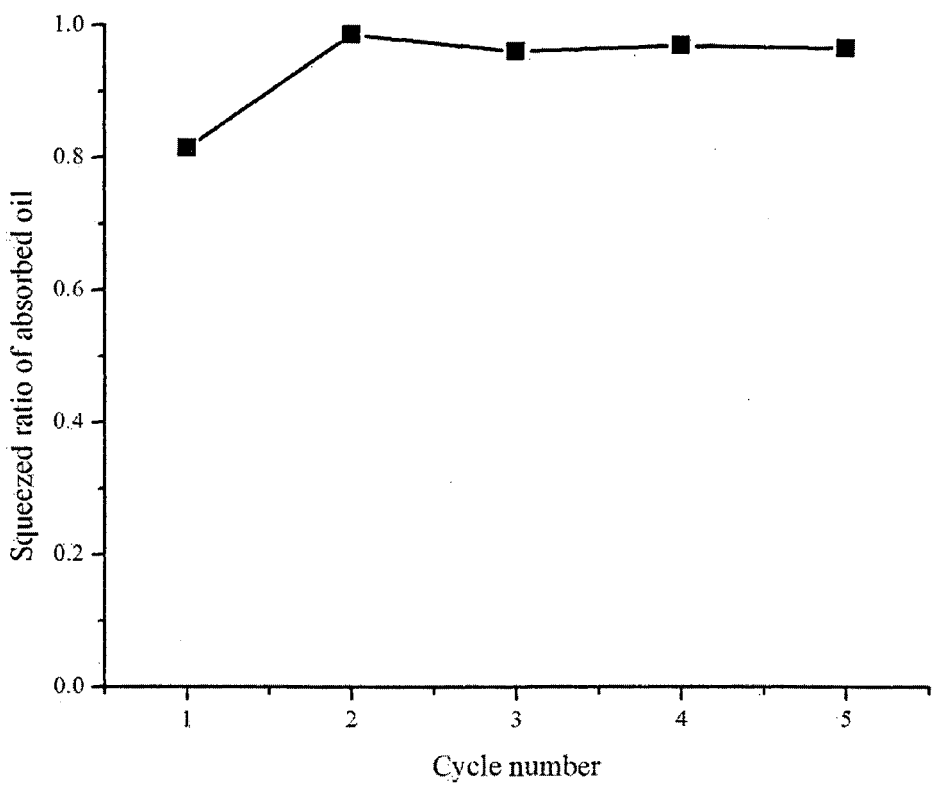
FIG. 11(b) is a graph showing the effect of sorption cycles on the squeezed ratio of absorbed oil.

The oil absorption capacities of the aerogel after five sorption cycles are displayed in FIG. 11(a). The sample achieved a high absorption capacity of 18.4 g/g in cycle 1. However, the capacity dropped to 0.96, 0.68, 0.59 and 0.63 g/g in cycles 2, 3, 4 and 5, respectively. This phenomenon can be explained based on the change of the aerogel volume (calculated by Equation 2), as shown in FIG. 11(a). After cycle 1, the aerogel was squeezed to remove the absorbed oil and the squeezed aerogel was used for cycle 2. After this squeezing, the ratio of the volume of the squeezed aerogel and its original volume was 0.32 indicating that the porous structure of the aerogel had largely collapsed. As a result, the oil absorption capacity of the aerogel sharply decreased to 0.96 g/g in cycle 2. In later cycles, the volume ratio values (0.27, 0.23 and 0.29) were similar to the value after the first cycle implying that the aerogel structure did not change anymore. Regarding the squeezed amount of the absorbed oil (calculated by Equation 3), as presented in FIG. 11(b), 81.5, 98.5, 95.9, 96.9 and 96.4% of the absorbed oil were released after cycles 1, 2, 3, 4, and 5, respectively, by using simple squeezing.

Figures 12A, 12B, 12C, 12D, 12E, 12F:
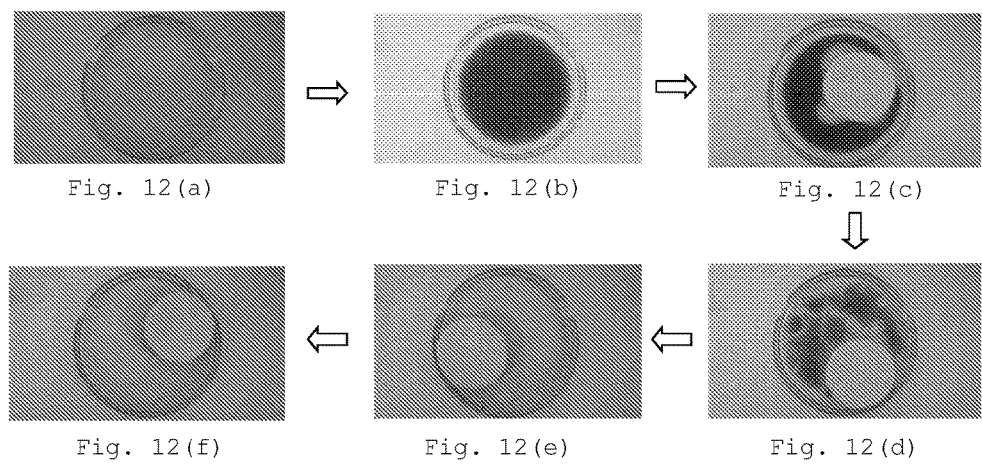
FIG. 12(a) is a photographic image of the top view of the water sample before the addition of Oil (3).
FIG. 12(b) is a photographic image of the top view of the mixture of water and oil.
FIG. 12(c) is a photographic image of the top view of the MTMS-coated cellulose aerogel when placed in the mixture of FIG. 12(b).
FIG. 12(d) is a photographic image of the top view of the aerogel absorbing the oil from the mixture of water and oil at a time duration of 1 minute.
FIG. 12(e) is a photographic image of the top view of the aerogel at a time duration of 3 minutes.
FIG. 12(f) is a photographic image of the tope view of the aerogel at a time duration of 4 minutes.

FIG. 12(a) to FIG. 12(f) are a succession of photographs showing the crude oil absorption test of the aerogel in a mixture of Oil (3) and DI water (40 ml water/5 ml of Oil (3)). FIG. 12(a) is a photograph of the DI water used at the beginning. Oil (3) was then added to the water, which formed as a dark layer on the water surface (FIG. 12(b)). In FIG. 12(c), the aerogel was added to the mixture and it can be observed that the hydrophobic aerogel floated on the mixture and rapidly absorbed Oil (3). FIG. 12(d) and FIG. 12(e) show the absorption of the oil by the aerogel after 1 minute and 3 minutes respectively. After about 4 minutes, most of the oil (99.4%) was absorbed by the hydrophobic aerogel (FIG. 12(f)). The test indicated that the MTMS-coated aerogel is promising for crude oil spill cleaning application.

Comparative Example

Synthesis of Aerogel from Pure Cellulose Fibers

Pure cellulose fibers (1.2 wt %, obtained from Sigma-Aldrich) were dispersed in sodium hydroxide/urea solutions (1.5 wt % of NaOH with 10 wt % of urea) by stirring for 15 minutes. The solution was placed in a refrigerator for more than 24 hours to allow gelation of the solution. The gel was then thawed at room temperature (of about 25° C.) and then followed by immersing into ethanol (99%) for coagulation. In order to control the thickness of the aerogel, a beaker was used as a mold to control the thickness at 1 cm and a diameter of 3.5 cm. After coagulation, solvent exchange was carried out by immersing the gel in de-ionised water for 2 days. To dry the sample without destroying the structure, freeze drying was carried out. The sample was frozen in a freezer at −18° C. for 12 hours. After this, freeze drying was carried out for 2 days with a ScanVac CoolSafe 95-15 Pro freeze dryer to obtain the desired cellulose aerogel.

The cellulose aerogel synthesized from pure cellulose fibers had pores that were in the nanosized range. In addition, the diameter of the pure cellulose fibers was in the range of 5 to 20 nm, with length of up to several micrometer.

The pure cellulose aerogel was subjected to a flexibility test and it was found that the aerogel was not flexible and was brittle. The sample broke easily after the test.

In addition, the pure cellulose aerogel was subjected to the same oil absorption test as mentioned in Example 6 and it was found that the oil absorption capacity of this aerogel was 10 g/g.

Hence, as compared to cellulose aerogels synthesized from recycled cellulose fibers, the pure cellulose aerogel had a lower oil absorption capacity (which is most probably due to the smaller pores in the aerogel) and was inflexible.

Applications

The process to form the polysaccharide based aerogel from recycled polysaccharide fibers may be cost effective and simple.

By using recycled polysaccharide fibers such as recycled cellulose fibers, conventional methods of synthesizing cellulose fibers from bioengineering processes or from wood powders are not required, which are usually complicated, expensive or requires the use of toxic and environmental-polluting chemicals such as benzene to remove wax or lignin from wood powders. Hence, the use of recycled cellulose fibers from recyclable material is environmental friendly and may reduce carbon footprint.

Due to the thermal insulation properties of the polysaccharide based aerogel, it may be used in thermal and acoustic insulation industries. If the polysaccharide based aerogel is coated with a hydrophobic agent, the coated polysaccharide based aerogel may possess "self-cleaning" properties and may be used a surface to confer both insulating and cleaning effects. In addition, the hydrophobic property of the polysaccharide based aerogel may protect the surface from moisture attack. Hence, the polysaccharide based aerogel may be applied onto the exterior wall of a building or a vehicle, or as an insulating layer in a piece of clothing.

The ability of the polysaccharide based aerogel to absorb a polar liquid such as water or an aqueous solution allows the polysaccharide based aerogel to be used in applications where high absorption capacities are required. For example, the polysaccharide based aerogel may be used as an absorbent in diapers, sanitary napkins, etc.

The hydrophobic polysaccharide based aerogel may be used in oil remediation or in applications where hydrophobicity is required.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A polysaccharide based aerogel comprising a network of polysaccharide fibers with pores therebetween, wherein the polysaccharide fibers are obtained from recycled cellulose fibers, the sizes of the pores are in the range of 20 to 1000 μm and the diameters of the polysaccharide fibers are in the range of 5 to 100 μm, wherein said aerogel, free of pure cellulose fibers, is formed from recycled cellulose fibers in the presence of a sonication power of 1500 to 2000 W and has an oil absorption capacity of 18.4-24.4 g/g.

2. The aerogel of claim 1, wherein the pore sizes are in the range of 20 to 50 μm, 50 to 1000 μm, 30 to 250 μm, or 40 to 200 μm.

3. The aerogel of claim 1, wherein the diameters of the polysaccharide fibers are in the range of 8 to 50 μm.

4. The aerogel of claim 1, wherein said aerogel has a porosity in the range of 94% to 98%.

5. The aerogel of claim 1, wherein the thermal conductivity of said aerogel is in the range of 0.02 to 0.04 $Wm^{-1}K^{-1}$.

6. The aerogel of claim 1, wherein said aerogel is coated with a hydrophobic agent.

7. The aerogel of claim 1, wherein said polysaccharide fibers are functionalized with a silane compound.

8. The aerogel of claim 7, wherein said silane compound comprises at least one functional group selected from the group consisting of alkenyl, alkyl, alkoxy, benzyl, acryloxy, amino, ureide, sulfide, isocyanurate, mercapto and isocyanate.

9. The aerogel of claim 1, wherein said recycled cellulose fibers are selected from the group consisting of lignin, hemicellulose, chitin, arabinoxylan and pectin.

10. The aerogel of claim 1, wherein said polysaccharide fibers are bonded to each other via hydrogen bonding.

11. A reusable absorbent comprising the polysaccharide based aerogel of claim 1.

12. The absorbent of claim 11, wherein the absorbance capacity of said absorbent for a liquid is up to 25 times the weight of said absorbent.

13. A method for forming a polysaccharide based aerogel of claim 1, the method comprising the steps of:
    a) dissolving polysaccharide fibers from recycled cellulose fibers in a polysaccharide solvent in the presence of a sonication power of 1500 to 2000 W to form a polysaccharide dispersion; and
    b) forming said polysaccharide dispersion into said aerogel.

14. The method of claim 13, wherein step b) comprises the steps of:
    c) forming said polysaccharide dispersion into a gel; and
    d) drying said polysaccharide gel to form said aerogel.

15. The method of claim 14, wherein said drying step d) comprises freeze-drying or supercritical drying.

16. The method of claim 13, wherein said polysaccharide solvent is an aqueous solution of alkali with urea or thiourea.

17. The method of claim 13, further comprising the step of e) coating said aerogel with a hydrophobic agent to form a hydrophobic polysaccharide based aerogel.

18. The method of claim 17, wherein said coating step comprises spraying said hydrophobic agent.

19. The method of claim 17, wherein said coating step comprises the step of applying said hydrophobic agent by gas phase chemical vapour deposition.

20. The method of claim 17, further comprising the step of removing excess hydrophobic agent from said coated hydrophobic aerogel.

* * * * *